(12) United States Patent
Innes et al.

(10) Patent No.: US 7,934,380 B2
(45) Date of Patent: May 3, 2011

(54) METHOD AND APPARATUS FOR ISOLATING INACTIVE FUEL PASSAGES

(75) Inventors: Matthew Christopher Innes, North Lancaster (CA); Walter Kasimierz Omielan, Dorval (CA); Richard John Hamby, Ste.Anne-de-Bellevu (CA)

(73) Assignee: Rolls-Royce Power Engineering plc, Derby (GB)

( * ) Notice: Subject to any disclaimer, the term of this patent is extended or adjusted under 35 U.S.C. 154(b) by 148 days.

(21) Appl. No.: 11/978,241

(22) Filed: Oct. 26, 2007

(65) Prior Publication Data

US 2008/0098994 A1 May 1, 2008

Related U.S. Application Data

(60) Provisional application No. 60/854,517, filed on Oct. 26, 2006.

(51) Int. Cl.
*F02C 1/00* (2006.01)
(52) U.S. Cl. .......... 60/737; 60/39.463
(58) Field of Classification Search ......... 60/39.094, 60/39.463, 39.55, 39.3, 737; 123/27 GE, 123/575
See application file for complete search history.

(56) References Cited

U.S. PATENT DOCUMENTS

| | | | |
|---|---|---|---|
| 2,617,252 A * | 11/1952 | Klein | 60/761 |
| 2,697,910 A * | 12/1954 | Brzozowski | 60/39.55 |
| 3,777,983 A * | 12/1973 | Hibbins | 239/422 |
| 4,041,695 A | 8/1977 | Harper et al. | |
| 4,168,609 A * | 9/1979 | Greenberg et al. | 60/804 |
| 4,327,547 A | 5/1982 | Hughes et al. | |
| 5,243,816 A | 9/1993 | Huddas | |
| 5,277,023 A | 1/1994 | Bradley et al. | |
| 5,615,555 A | 4/1997 | Mina | |
| 5,680,766 A | 10/1997 | Joshi et al. | |
| 5,778,676 A * | 7/1998 | Joshi et al. | 60/746 |
| 6,250,065 B1 * | 6/2001 | Mandai et al. | 60/776 |
| 6,609,380 B2 * | 8/2003 | Mick et al. | 60/776 |
| 6,804,946 B2 | 10/2004 | Willis et al. | |
| 2003/0121269 A1 | 7/2003 | Mick et al. | |
| 2006/0168966 A1 * | 8/2006 | Stuttaford et al. | 60/772 |
| 2007/0028617 A1 | 2/2007 | Hsieh et al. | |
| 2007/0231762 A1 | 10/2007 | Bernero et al. | |

FOREIGN PATENT DOCUMENTS

| | | |
|---|---|---|
| EP | 1 371 906 A2 | 12/2003 |
| EP | 1371906 | 12/2003 |
| EP | 1600693 | 11/2005 |
| EP | 1865260 | 12/2007 |
| WO | WO 2005/121649 A2 | 12/2005 |
| WO | WO 2005121649 | 12/2005 |
| WO | PCT/IB2007/004564 | 3/2009 |

* cited by examiner

*Primary Examiner* — William H Rodríguez
*Assistant Examiner* — Phutthiwat Wongwian
(74) *Attorney, Agent, or Firm* — Kreig DeVault LLP

(57) ABSTRACT

One aspect relates to an apparatus having a combustion chamber and a duct in fluid flow communication with the combustion chamber. The apparatus includes at least one opening adapted for delivering a liquid fuel into the duct. The apparatus further includes at least one passage adapted for delivery of a gas upstream of the at least one opening for minimizing the entrance of a fluid other than the gas into the fuel delivery opening.

13 Claims, 5 Drawing Sheets

US 7,934,380 B2

METHOD AND APPARATUS FOR ISOLATING INACTIVE FUEL PASSAGES

RELATED APPLICATIONS

The present application claims the benefit of U.S. Provisional Patent Application No. 60/854,517 filed Oct. 26, 2006 which is incorporated herein by reference.

TECHNICAL FIELD

The technical field generally relates to fuel injection, and more particularly relates to fuel injection where some fuel passages are inactive in some modes of operation. While the present application was developed for gas turbine engines, it is also applicable to other areas of technology including, but not limited to furnaces and rockets.

BACKGROUND

Inactive fuel passage(s) may be found in equipment for many reasons including, but not limited to: a pilot injector which is utilized for low power operation and may be turned off as required at higher power; staged fuel injector(s) which may be turned on and off based upon desired operating parameters; and/or fuel injectors utilized for operation on different types of fuel at different times. During times that a fuel passage is inoperative, hot combustion products and/or fuel can enter the passages. Also, an inoperative fuel passage for liquid fuel may have stagnant residual fuel that may be altered from exposure to temperature and/or contaminants. Altered stagnant fuel may solidify or otherwise affect the performance of the fuel passage and fuel injector. There is a continued need for a system that minimizes or prevents the introduction of hot combustion products and/or fuel and air into the inactive fuel passage(s) and includes a technique for flushing residual liquid fuel from the inactive fuel passage(s) as disclosed herein.

SUMMARY

One embodiment relates to an apparatus having a combustion chamber and a duct in fluid flow communication with the combustion chamber. The apparatus includes at least one opening adapted for delivering a liquid fuel into the duct. The apparatus further includes at least one passage adapted for delivery of a gas upstream of the at least one opening for minimizing the entrance of a fluid other than the gas into the fuel delivery opening. Further embodiments, forms, objects, features, advantages, aspects, and benefits shall become apparent from the following descriptions, drawings, and claims.

DESCRIPTION OF THE ILLUSTRATIVE EMBODIMENTS

Figure 1:
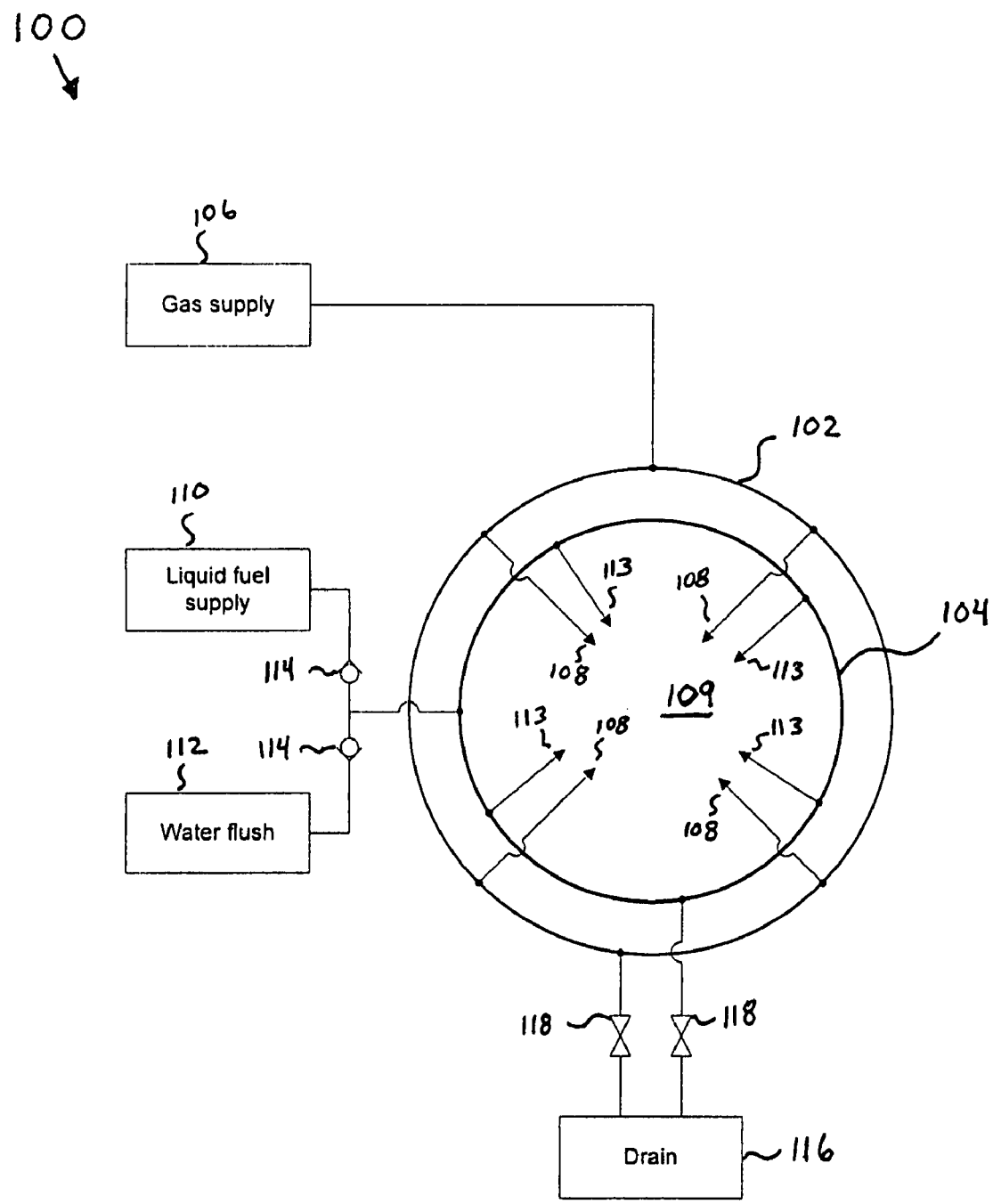
FIG. 1 is a schematic diagram of one embodiment of an apparatus for isolating inactive fuel passages.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and that such further applications of the principles of the invention as illustrated therein as would normally occur to one skilled in the art to which the invention relates are contemplated and protected.

With reference to FIG. 1, there is illustrated a schematic diagram of one embodiment of an apparatus 100 for isolating inactive fuel passages. The reader should understand that the present application is not limited to the following embodiment unless specifically provided to the contrary.

The apparatus 100 includes a fuel manifolding system with a gas manifold 102 and a liquid fuel manifold 104. The gas manifold 102 is fed by a gas supply 106, and may be fed gaseous fuel, air, purge air, and/or other gaseous streams at various operating conditions of the system 100 as understood by one of skill in the art. During some operating conditions, the gas manifold 102 may be shut off or flowing a nominal amount of gas. In one embodiment, the gas supply 106 provides gaseous fuel and the gas manifold 102 feeds a plurality of gas injectors 108 for the operation of a turbine engine. The gas injectors 108 may feed into a combustion chamber 109.

The liquid fuel manifold 104 is fed by a liquid fuel supply 110 and a water flush supply 112. The liquid fuel manifold 104 may be fed water or liquid fuel at various operating conditions of the apparatus 100. In some embodiments, the liquid fuel manifold 104 may be fed air, purge air, other streams, and/or may be shut off during some operating conditions. In one embodiment, the liquid fuel supply 110 provides diesel fuel, kerosene, liquid natural gas, or similar fuels to liquid injectors 113 that feed an internal combustion engine such as a turbine engine. The liquid injectors 113 may feed into a combustion chamber 109. The liquid fuel manifold 104 may be fed by lines including one-way valves 114 or similar protections to prevent flowback of fluids to the liquid supplies 110, 112.

The apparatus 100 further includes a drain 116 fluidly connected to the gas manifold 102 and the liquid fuel manifold 104. The drain 116 may comprise multiple drains 116 that may be separate from each other. The drain 116 may be separated from the manifolds 102, 104 by one or more valves 118. The valves 118 may comprise one-way valves, and may be controllable by an electronic controller (not shown) or the like.

In one embodiment, when fuel is not flowing to the gas manifold 102 or the liquid fuel manifold 104, a valve 118 fluidly connected to the dormant manifold 102, 104 is momentarily opened. The dormant manifold 102, 104 may be pressurized by a purge fluid, causing the dormant manifold 102, 104 to back-flush into the drain 116. The purge fluid may be compressor air or any other generally inert fluid.

Figure 2:
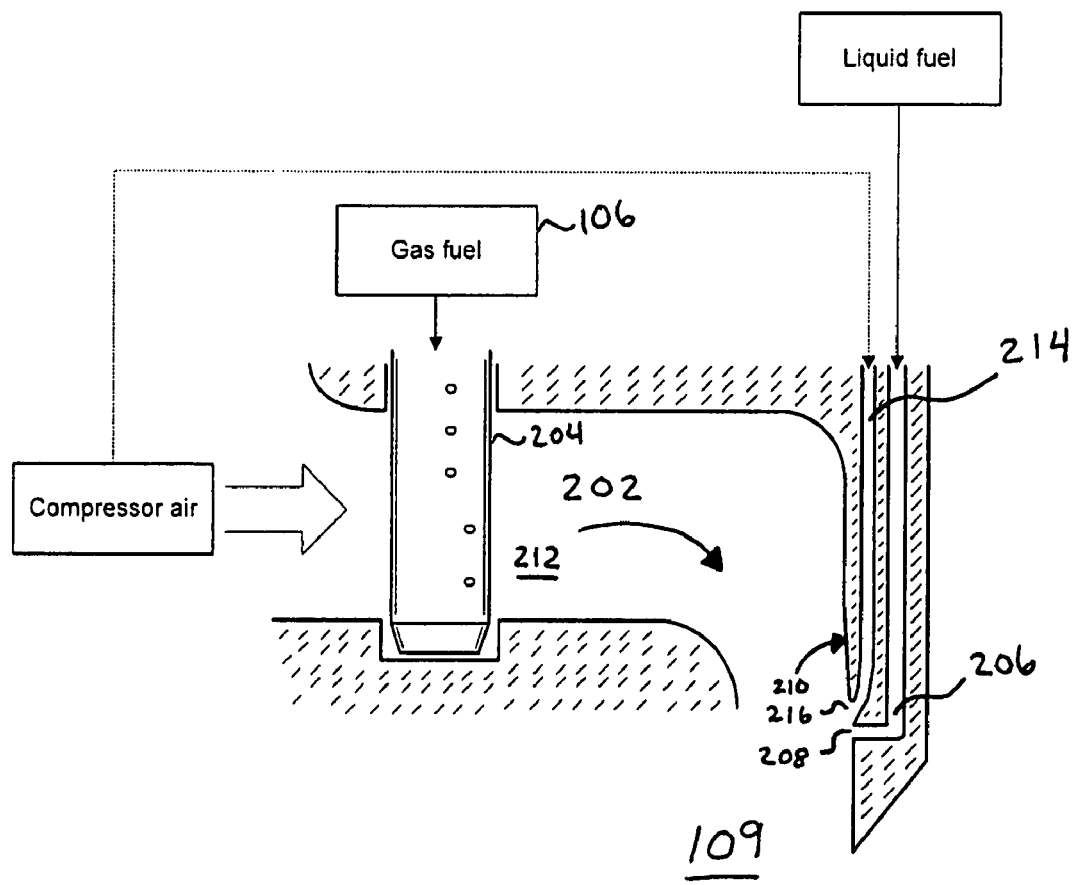
FIG. 2 is a schematic diagram of one embodiment of a duct in fluid communication with a combustion chamber.
Figure 3:
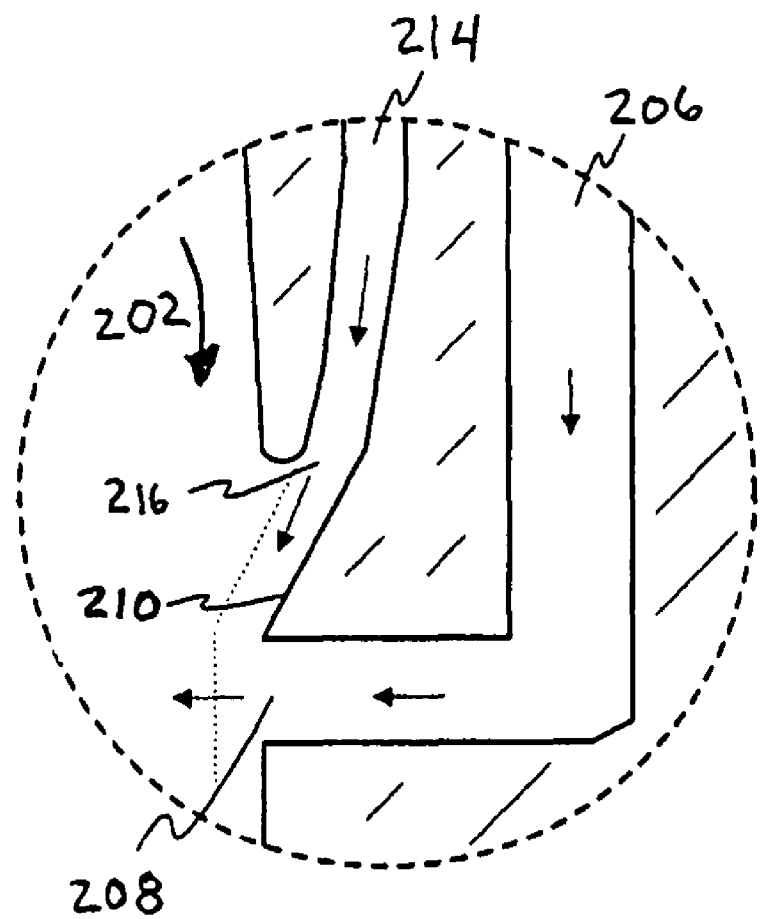
FIG. 3 is a schematic diagram of one embodiment of at least one passage adapted for delivery of a gas upstream of an opening adapted for delivery of a liquid fuel into a duct.

Referring to FIGS. 2 and 3, there is illustrated a schematic diagram of one embodiment of a duct 202 in fluid communication with a combustion chamber 109. In one aspect, the combustion chamber 109 forms a portion of a gas turbine engine. However, the present application is not limited to gas turbine engines. In one embodiment, the duct 202 is a radial and/or annular duct 202 adapted to deliver a fuel and air mixture to the combustion chamber 109. A gaseous fuel delivery device 204 discharges gaseous fuel into the duct 202. In one aspect of the present application, the gaseous fuel delivery device 204 may be a fuel injector 108 such as one depicted in FIG. 1.

A liquid fuel passage 206 is adapted for passage of liquid fuel and/or a purging agent through at least one opening 208 formed in the duct wall 210 for the discharge of liquid fuel and/or a purging agent into the duct 202. The opening 208 may be a discrete hole or a continuous opening. In another form the at least one opening 208 is defined by a plurality of spaced openings (not shown). The at least one opening 208 is located downstream of the area of gas fuel injection 212 associated with the gaseous fuel delivery device 204.

Another fluid flow passage 214 adapted for passage of a gas through at least one opening 216 that may be upstream of the liquid fuel opening 208. The opening 216 may be a discrete hole or a continuous opening. The gas opening 216 may be a plurality of openings that correspond to the liquid fuel openings 208. For example, there may be one gas opening 216 upstream of each liquid fuel opening 208. In an alternate embodiment, there may be a plurality of gas openings 216 for each liquid fuel opening 208, wherein at least one of the plurality of gas openings 216 is directly upstream of the liquid fuel opening 208. As used herein, directly upstream indicates a geometric positioning (i.e. a position such that gas flowing from the gas opening 216 flows across the liquid fuel opening 208) and a distance positioning. The distance that comprises directly upstream depends upon the flow rates in the duct 202 and the flow rate of gas coming out of the gas opening 216. A substantial amount of the gas from the opening 216 should flow across the liquid fuel opening 208 before separation from the duct wall 210 and diffusion into the main duct 202 stream. The determinations for such an arrangement are mechanical steps for one of skill in the art based upon the disclosures herein.

In one form the fluid flow passage 214 is relatively small in comparison to the duct 202 and can deliver a flow of gas immediately upstream of the liquid fuel opening 208. In one form of the present application the flow of gas forms a shielding film directed in substantially the same direction as the bulk fluid flow in the duct 202. The gas may be air that is extracted from a compressor associated with a turbine engine, however the present application is not limited to air from the compressor and the gas may be from other sources. For clarification, the fluid flowable through the passage 214 is a gas and may or may not be air. In one form of the present application the fluid flow passage 214 is concentric with the duct 202.

In a liquid fuel operating mode, liquid fuel passes through the liquid fuel passage 206 and is supplied through the liquid fuel opening 208 into the duct 202. The discharge of liquid fuel through the opening 208 may form a series of jets that discharge into the duct 202. In one form the fuel jets discharge at a high angle of attack into the flow of air or gaseous fuel and air mixture and are atomized by the shearing action of that flow of fluid in the duct 202. For example, the angle may be perpendicular as shown in FIG. 2, although other angles are possible and it is a mechanical step for one of skill in the art to determine an angle sufficient for fuel atomization in a particular embodiment. The present application contemplates other directions of discharge in addition to perpendicular.

In one form of the present application, the flow of gas through the fluid flow passage 214 has relatively little momentum in comparison to the liquid fuel jets through the liquid fuel opening 208 and does not influence the atomization of the liquid fuel jets. For the purposes of the present application, relatively little momentum indicates that if gas flow through the fluid flow passage 214 continues uninterrupted, the gas flow from the gas opening 216 does not significantly disturb the liquid fuel delivery through the liquid fuel opening 208.

For purposes of illustration, FIG. 2 generally depicts a gaseous flow passage 214 upstream of a liquid fuel flow passage 206, thereby creating a gas injector blocking and/or shielding an inactive liquid flow passage 206. However, the upstream flow passage 214 may be a gas or liquid injection passage, and the downstream flow passage 206 may be a gas or liquid injection passage. Therefore, embodiments including an upstream injector shielding a downstream injector are contemplated within the scope of the present application.

Referring to FIG. 3, in one preferred form of the present application a wall portion 210 of the duct 202 between the gas opening 216 and the liquid fuel opening 208 is smooth and free of transitions that might cause the gas film to separate before reaching the liquid opening 208. The gas delivered from the gas flow passage 214 may be delivered at a flow rate such that the gas remains in laminar flow across the liquid fuel opening 208. Other wall configurations for the wall portion 210 are contemplated herein.

Referring back to FIG. 2, upon termination of liquid fuel flow, which may be just a temporary interruption of the liquid fuel flow, a valve acts to admit fluid to the liquid fuel passage 206, flushing the passage 206 of liquid fuel. The fluid admitted to flush the liquid fuel passage 206 may be referred to herein as a purge fluid. The purge fluid may be water from an engine compressor wash water supply, nitrogen from air bottles, air, or other fluids believed to be known to one skilled in the art. In one embodiment, the purge fluid comprises water from the water flush supply 112.

After a predetermined period of time, the flow of purge fluid is interrupted. It should be understood that in one embodiment there are periods of time when neither liquid fuel or purge fluid are passed through the liquid fuel passage 206. The purge fluid flow may be controlled through valves and/or other flow control devices. The purge fluid flow may occur for a predetermined time calculated according to engine operating conditions during or preceding the purge, including but not limited to operating temperatures, properties of the fuel and/or purge fluid to be utilized, and other parameters known in the art that may affect the time and/or fluid volume required for an effective purge of the liquid fuel passage 206 and/or associated manifolds 102, 104, fuel supply lines, and the like.

In a pre-mix gas fuel mode, gaseous fuel is supplied to the gaseous fuel delivery device 204 with air in the duct 202 before discharging into the combustion chamber 109. The film or curtain of air provided by the fluid flow passage 214 flows across the liquid fuel opening 208 and reduces or prevents the gas/air mixture in the duct 202 from entering the liquid fuel passage 206. In one form the gas film flowing over the opening(s) 208 function to aerodynamically isolate the inactive liquid fuel passage 206 from other fluid flow within the duct 202. In one embodiment, the gas provided by the fluid flow passage 214 partially or completely blocks the ingress of the gaseous fuel and air mixture flowing in the duct 202 into the entrance of the inactive liquid fuel passage 206. In an embodiment where the ingress of the mixture is partially blocked, the fluid flow passage 214 provides sufficient gas to ensure an air/fuel ratio within the inactive liquid fuel passage 206 less than that required to support combustion. The amount of gas that must be provided through the fluid flow passage 214 to achieve sufficient blockage depends upon the flow rates, fluid densities, and passage 206, 214 and duct 202 sizes. The gas film is preferably formed of a quantity of clean air, however other gases and quality of air are contemplated herein.

Figure 4:
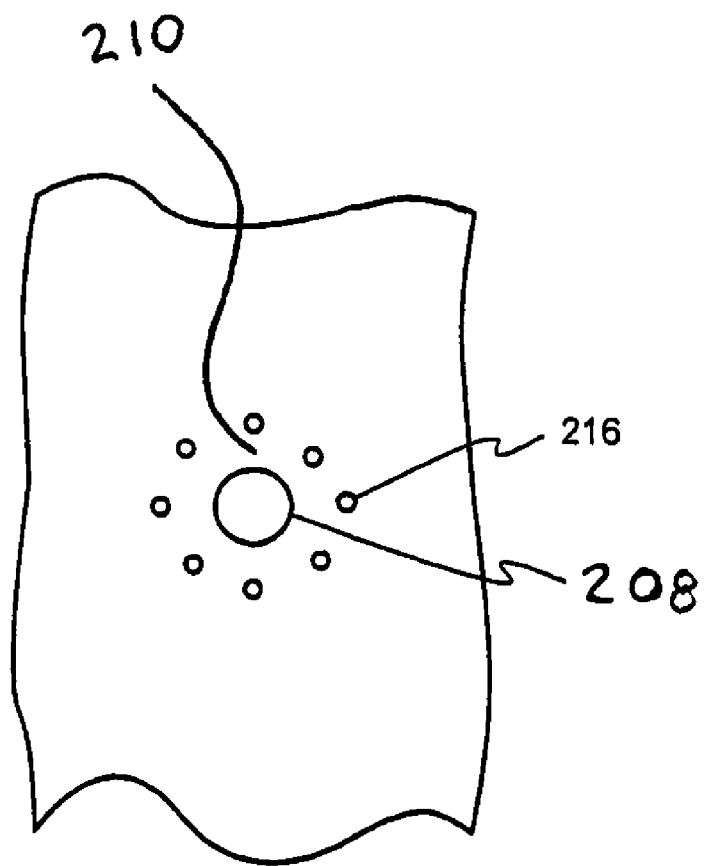
FIG. 4 is a schematic diagram of one embodiment of a plurality of passages arranged concentrically around the at least one opening adapted for delivery of a liquid fuel into a duct.

Referring to FIG. 4, in one embodiment the fluid flow within the duct 202 proximate to the liquid fuel opening 208 is in a first direction, and the liquid fuel delivered through the opening 208 flows in a second direction substantially perpendicular to the first direction. However, other flow directions are contemplated herein. The gaseous fluid passage 214 comprises a plurality of passages 214 fluidly connected to a plurality of gas flow openings 216 arranged concentrically around the liquid fuel opening 208, and the gas delivered from the passages 214 flows substantially in the second direction (i.e. the direction of flow through the liquid fuel opening 208). At least one of the gas flow openings 216 arranged concentrically around the liquid fuel opening 208 is upstream of the liquid fuel opening 208. The arrangement illustrated in the embodiment of FIG. 4 is similar to an air spoke atomizer, but the air flow in the gaseous fluid passages 214 is substantially lower than in a typical air spoke atomizer. Specifically, the gas flow through the passages 214 can continue during delivery of fuel through the liquid fuel opening 208 without disturbing the atomization and delivery of liquid fuel to the stream flowing in the duct 202.

Figure 5:
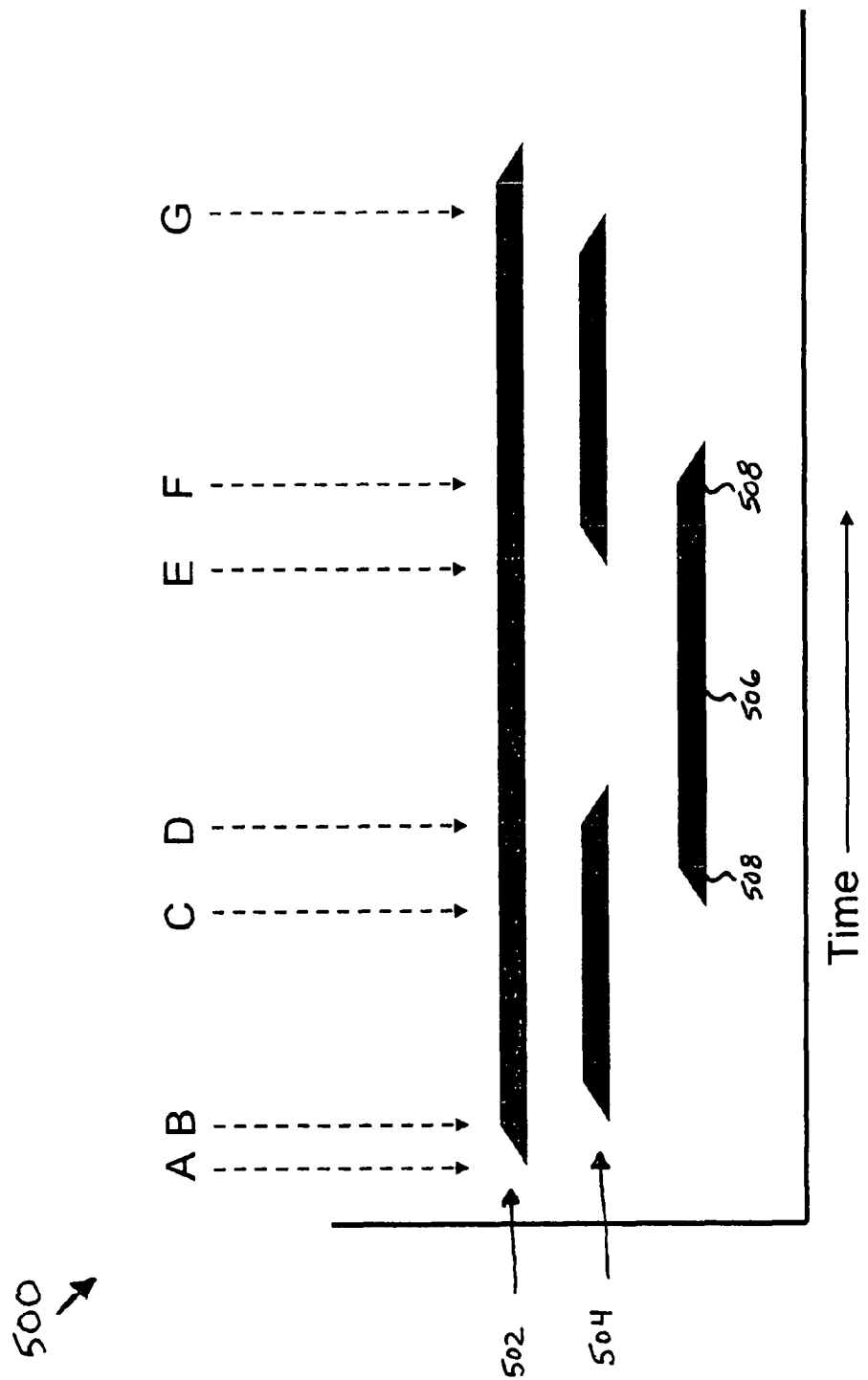
FIG. 5 is a timeline schematically illustrating isolating inactive fuel passages.

Referring to FIG. 5, a timeline 500 schematically illustrating isolating inactive fuel passages is depicted. The timeline indicates a flow value of purge air fluid 502, a flow value of gaseous fuel 504, a flow value of liquid fuel 506, and a flow value of a liquid purge fluid 508. The flows indicated in the timeline 500 are schematic only, and do not indicate relative flow rates or other features of the flows.

For purposes of illustration, the timeline 500 begins with an engine startup at time A and an engine shutdown at time G, but the operations of isolating inactive fuel passages may proceed on a continuing basis. The order of steps described herein is not intended to be limiting, and the steps may be performed in a different order, with delays, and the like unless explicitly stated otherwise.

The timeline 500 begins with starting an engine and beginning a flow of purge air through the gaseous flow passage 214 at time A. The ramp-up time to achieve full gaseous flow is schematic only, and the actual time to full gaseous flow is dependent upon various parameters for a particular system. Other ramp-up and ramp-down times shown in the timeline 500 are similarly schematic in nature. The timeline 500 continues with beginning a gaseous fuel flow at time B. While the engine is fueled by gaseous fuel, the purge air flows and isolates the inactive liquid fuel passage 206. An engine with dual-fuel capability begins a switch to liquid fuel at time C, which may include beginning with a water flush. After a prescribed time, occurring in the example at time D, the liquid fueling begins and the gaseous fueling is shut down.

At a later time E, the engine begins to switch from liquid fueling to gaseous fueling. In one embodiment, a water flush is performed for a period after the engine begins gaseous fueling. Again during gaseous fueling the purge air flows and isolates the inactive liquid fuel passage 206. At a time G, the gaseous fueling is shut off, the engine is shut down, and the purge air is shut down. In one embodiment, the purge air flows throughout the engine operation from time A to time G, during times of liquid fueling and during times with no liquid fueling. The illustrated embodiment allows the use of a completely passive purging system to isolate inactive fuel passages 206, allowing the purging system to operate without valves and controls.

As is evident from the figures and text presented above, a variety of embodiments according to the present invention are contemplated. In one form of the present application there is provided a system for minimizing or preventing the introduction of hot combustion products and/or fuel and air into the inactive fuel passage(s). In another form of the present application the fuel injector is utilized to deliver liquid fuel at times and includes a technique for flushing residual liquid fuel from the inactive fuel passage(s). The present application further contemplates a system that minimizes or prevents the introduction of hot combustion products and/or fuel and air into the inactive fuel passage(s) and includes a technique for flushing residual liquid fuel from the inactive fuel passage(s).

Certain exemplary embodiments include an apparatus comprising a combustion chamber and a duct in fluid flow communication with the combustion chamber. The duct may be an annular duct. In further exemplary embodiments at least one opening is adapted for delivering liquid fuel into the duct and at least one passage adapted for delivery (i.e. delivery passage) of a gas upstream of the at least one opening for minimizing the entrance of a fluid other than the gas into the fuel delivery opening. In further exemplary embodiments, the fluid flow in the duct comprises a gaseous fuel and air mixture. In some embodiments, the fluid flow within the duct proximate to the at least one opening is in a first direction, and the gas delivered from the at least one passage flows substantially in the first direction.

Certain embodiments include a gas deliverer adapted to deliver a gaseous fuel into the duct upstream of the at least one opening. In some embodiments, the at least one opening defines a plurality of spaced openings in the duct. In certain exemplary embodiments, the at least one delivery passage is just prior to the at least one opening, and a wall portion of the duct between the at least one passage and the at least one opening is smooth. The gas delivered from the at least one passage may be delivered at a flow rate such that the gas remains in laminar flow across the at least one opening.

In further exemplary embodiments, a third fluid is in flow communication with the at least one opening adapted for delivering liquid fuel into the duct, the third fluid being selectively dispensed through the at least one opening. The third fluid may be a purge fluid.

Certain exemplary embodiments include an apparatus comprising a combustion chamber and a duct in fluid flow communication with the combustion chamber. Further embodiments include a first passage adapted for delivering at least one of a liquid fuel and a purging fluid into the duct through at least one opening, and a gaseous fuel dispenser located upstream of the at least one opening; operable to dispense a gaseous fuel into the duct to form a gaseous fuel and air mixture. Further exemplary embodiments include a second passage adapted for delivering a gas through at least one hole located upstream of the at least one opening for shielding the at least one opening from the introduction of the gaseous fuel and air mixture from the duct. Further embodiments include the second passage comprising a plurality of holes arranged concentrically around the first passage. In a further embodiment, the fluid flow within the duct may be in a first direction, where the first passage delivers the liquid fuel and/or purging fluid into the duct in a second direction. In an exemplary embodiment, the second passage delivers the gas in substantially the second direction, and the second direction is substantially perpendicular to the first direction.

Certain exemplary embodiments include a method comprising flowing a gaseous fuel and air mixture through a duct, and shielding an entrance to a liquid fuel delivery opening with a secondary gas to block the passage of the gaseous fuel and air mixture into the entrance.

Certain exemplary embodiments include a method comprising discharging a gaseous fuel into a duct to form a fuel and air mixture, the duct being disposed in fluid flow communication with a combustion chamber. In further embodiments, the method includes delivering a liquid fuel through a passage and out of at least one opening into the duct. The method further includes interrupting the delivering and flowing a second gas over the at least one opening to block the flow of the fuel and air mixture into the opening. In certain embodiments, the method further includes flowing the second gas in laminar flow over the at least one opening. The method may further include purging the passage of liquid fuel after interrupting the delivering, wherein purging the passage may comprise receiving purge air from a purge air supply, and flowing the purge air into a liquid fuel manifold in fluid communication with the passage.

Certain exemplary embodiments include an apparatus comprising a combustion chamber and a duct in fluid flow communication with the combustion chamber. The apparatus further includes at least one liquid fuel delivery opening adapted for delivering a liquid fuel into the duct, and a means for aerodynamically isolating the at least one liquid fuel delivery opening from the duct. In certain embodiments, the method further includes a means for purging the liquid fuel from the at least one liquid fuel delivery opening.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

What is claimed is:

1. An apparatus comprising:
   a combustion chamber:
   a duct in fluid flow communication with the combustion chamber and having a passageway for a duct stream:
   at least one opening adapted for delivering a first fluid into the duct;
   at least one passage adapted for delivery of a second fluid through another opening into the duct such that delivery of the second fluid minimizes the entrance of a fluid other than the second fluid into the first fluid delivery opening when the first fluid is not flowed through the first fluid delivery opening, wherein the second fluid is different than the first fluid; and
   a fuel injection opening within the duct positioned upstream of the at least opening such that fuel is injected into the combustion chamber during operation, wherein the at least one opening and the passageway defined by a duct wall.

2. The apparatus of claim 1, wherein the first fluid comprises a liquid fuel and wherein the second fluid comprises a gas.

3. The apparatus of claim 1, wherein the fluid is a gaseous fuel and air mixture.

4. The apparatus of claim 1, wherein the fluid flow within the duct proximate the at least one opening is in a first direction, and wherein the second fluid delivered from the at least one passage flows substantially in the first direction.

5. The apparatus of claim 1, wherein the fuel injection opening is adapted to deliver a gaseous fuel into the duct upstream of the at least one opening.

6. The apparatus of claim 1, wherein the at least one opening defines a plurality of spaced openings in the duct.

7. The apparatus of claim 1, wherein the duct is an annular duct.

8. The apparatus of claim 1, wherein the fluid flow within the duct proximate the at least one opening is in a first direction, and wherein the first fluid delivered from the at least one opening flows in a second direction.

9. The apparatus of claim 8, wherein the at least one passage comprises a plurality of passages arranged concentrically around the at least one opening, wherein the second fluid delivered from the at least one passage flows substantially in the second direction.

10. The apparatus of claim 1, wherein the at least one delivery passage is just prior to the at least one opening.

11. The apparatus of claim 10, wherein a wall portion of the duct between the at least one passage and the at least one opening is smooth, and wherein the second fluid delivered from the at least one passage is delivered at a flow rate such that the second fluid remains in laminar flow across the at least one opening.

12. The apparatus of claim 1, which further includes a third fluid in flow communication with the at least one opening, the third fluid being selectively dispensed through the at least one opening.

13. The apparatus of claim 5, wherein the gaseous fuel is the fluid.

* * * * *